United States Patent [19]
Salomon et al.

[11] Patent Number: 4,561,757
[45] Date of Patent: Dec. 31, 1985

[54] BELT SUPPORT APPARATUS

[75] Inventors: James A. Salomon; Donald J. Weikel, Jr., both of Rochester, N.Y.

[73] Assignee: Xerox Corporation, Stamford, Conn.

[21] Appl. No.: 708,202

[22] Filed: Mar. 4, 1985

[51] Int. Cl.⁴ ...................... G03G 15/00; B65G 15/60
[52] U.S. Cl. .................................. 355/3 BE; 355/16; 198/840
[58] Field of Search ............... 355/3 BE, 16; 198/840; 226/193; 29/116 R

[56] References Cited

U.S. PATENT DOCUMENTS

| | | | |
|---|---|---|---|
| 3,534,893 | 10/1970 | Maxson | 226/193 X |
| 3,643,791 | 2/1972 | Thornsbery | 198/184 |
| 3,726,588 | 4/1973 | Moser | 355/3 |
| 3,961,736 | 6/1976 | Fatula | 226/192 |
| 4,221,480 | 9/1980 | Spehrley, Jr. | 355/3 BE |

*Primary Examiner*—A. T. Grimley
*Assistant Examiner*—C. Romano
*Attorney, Agent, or Firm*—H. Fleischer; J. E. Beck; R. Zibelli

[57] ABSTRACT

An apparatus in which lateral movement of a moving belt is controlled so that the belt moves in a pre-determined path. The apparatus includes at least one rotatably mounted roller having an elastic membrane entrained thereabout. The coefficient of friction between the elastic membrane and the roller is low so as to form a low friction interface therebetween. A pair of opposed, spaced flanges constrain the belt. As the belt moves in a lateral direction, one of the flanges engages a side edge of the belt to prevent lateral movement thereof. When the side edge of the belt engages the flange, the elastic membrane slips on the roller when the force applied on the side edge of the belt is greater than the maximum frictional force between the roller and the elastic membrane, in the direction of lateral movement of the belt. The frictional force between the elastic membrane and the roller, in the direction of lateral movement of the belt, is less than the minimum force required to produce buckling of the side edge of the belt. In this way, side edge buckling is prevented and the belt is maintained in the pre-determined path of movement thereof.

10 Claims, 3 Drawing Figures

BELT SUPPORT APPARATUS

This invention relates generally to an apparatus for supporting a belt arranged to move in a pre-determined path and for controlling lateral movement of the belt from the pre-determined path. An apparatus of this type is frequently employed in an electrophotographic printing machine where it is necessary to control lateral movement of the photoconductive belt to closely prescribed tolerances.

Generally, an electrophotographic printing machine includes a photoconductive member which is charged to a substantially uniform potential to sensitize the surface thereof. The charged portion of the photoconductive surface is exposed to a light image of an original document being reproduced. This records an electrostatic latent image on the photoconductic surface corresponding to the informational areas contained within the original document being reproduced. After the electrostatic latent image is recorded on the photoconductive member, the latent image is developed by bring a developer mix of carrier granules and toner particles into contact therewith. The toner particles are attracted from the carrier granules to the latent image forming a toner powder image on the photoconductive member. The toner powder image is then transferred from the photoconductive member to a copy sheet. Finally, the toner particles are permanently heated affixing them to the copy sheet in image configuration.

It is apparent that the location of the latent image recorded on the photoconductive belt must be precisely defined in order to have the various processing stations acting thereon optimize copy quality. To this end, it is critical that the lateral alignment of the photoconductive belt be controlled within prescribed tolerances. Only in this manner will the photoconductive belt move through a pre-determined path so that the processing stations disposed thereabout will be located precisely relative to the latent image recorded thereon.

When considering control of the lateral movement of the photoconductive belt, it is well known that if the belt were perfectly constructed and entrained about perfect cylindrical rollers mounted and secured in an exactly parallel relationship with one another, there would be no lateral movement of the belt. In actual practice, however, this is not feasible. Due to the imperfections of the system geometry, the belt velocity vector is not normal to the roller axis of rotation and the belt will move laterally relative to the roller until reaching a kinematically stable position. Methods of controlling belt lateral movement comprise servo systems, crowned rollers, and flanged rollers. In any control system, it is necessary to prevent high local stresses which may result in damage to the highly sensitive photoconductive belt. Active systems, such as servo systems employing steering rollers apply less stress on the photoconductive belt. However, active systems of this type are generally complex and costly. Passive systems, such a flanged rollers or rollers having stationary flanges are less expensive but generally produce high stresses. Various types of flanged roller systems have hereinbefore been developed to improve the support and tracking of photoconductive belts. For example, the drive roller may have a pair of flanges secured to opposed ends thereof. If the photoconductive belt moves laterally and engages one of the flanges, it must be capable of either sliding laterally with respect to the roller system or locally deforming either itself or the roller system to maintain this position. The edge forces required to shift the belt laterally or locally deform it or the roller system usually greatly exceed the maximum tolerable edge forces. Thus, the belt would start to buckle resulting in failure of the system. Belt edge forces are large because the system rollers have low lateral compliance and a large coefficient of friction. Systems of this type have an exceedingly short life and are not satisfactory for controlling lateral movement of the sensitive photoconductive belt in an electrophotographic printing machine.

It is, therefore, apparent that it is highly desirable to develop a flanged roller system which produces small edge forces. Various types of rollers have been devised to control belt lateral movement. The following patents appear to be relevant:

U.S. Pat. No. 3,643,791, Patentee: Thornsbery, Issued: Feb. 22, 1972.

U.S. Pat. No. 3,726,588, Patentee: Moser, Issued: Apr. 10, 1973.

U.S. Pat. No. 3,961,736, Patentee: Fatula, Issued: June 8, 1976.

The relevant portions of these patents may be briefly summarized as follows:

Thornsbery discloses a roller for automatically centering a belt. The roller includes a shaft having a rubber sleeve mounted thereon. A circumferential slot is formed in the sleeve at the transverse central plane of the roll. Helical slots are formed in the sleeve. One of the slots has a right-hand lay, the other a left-hand lay. The slots are inclined radially toward the axis of the roll away from the transverse center.

Moser describes a steering roller for a belt. The roller has two axial chambers and an elastomeric surface. Fluid pressure is selectively applied to either chamber in response to lateral movement of the belt to tilt the roll surface. This corrects belt alignment.

Fatula describes a self-centering roll comprising a tube having a first rubber sleeve mounted thereon. A seamed rubber sleeve is mounted on the first sleeve. The second rubber sleeve has a central slot and spaced apart slots in each side of the central slot. The slots on each side of the central slot are inclined radially toward the roll axis away from the central slot.

In accordance with one aspect of the present invention, there is provided an apparatus for supporting a belt arranged to move in a pre-determined path and for controlling lateral movement of the belt from the pre-determined path. The apparatus includes at least one rotatably mounted roller. Means, interposed between the roller and the belt, support the belt. The supporting means has a low coefficient of friction to form a low friction interface between the supporting means and the roller. Means, engaging at least one side edge of the belt, prevent lateral movement of the belt with the supporting means slipping on the roller when the force applied on the side edge of the belt is greater than the maximum frictional force between the roller and the supporting means, in the direction of lateral movement of the belt.

Pursuant to another aspect of the present invention, there is provided an electrophotographic printing machine of the type having a photoconductive belt supported on an apparatus which moves the photoconductive belt in a pre-determined path and controls lateral movement of the photoconductive belt so that successive portions of the photoconductive belt move through processing stations disposed thereabout to form a toner powder image thereon which is transferred to a copy sheet and permanently affixed thereto. The apparatus for moving the photoconductive belt and controlling lateral movement thereof includes at least one rotatably mounted roller. Means, interposed between the roller and the photoconductive belt, support the photoconductive belt. The supporting means has a low coefficient to friction to form a low friction interface between the supporting means and the roller. Means, engaging at least one side edge of the photoconductive belt, prevent lateral movement of the photoconductive belt. The supporting means slips on the roller when the force applied on the side edge of the photoconductive belt is greater than the maximum frictional force between the roller and the supporting means, in the direction of lateral movement of the photoconductive belt.

Other features of the present invention will become apparent as the following description proceeds and upon reference to the drawings, in which.

While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
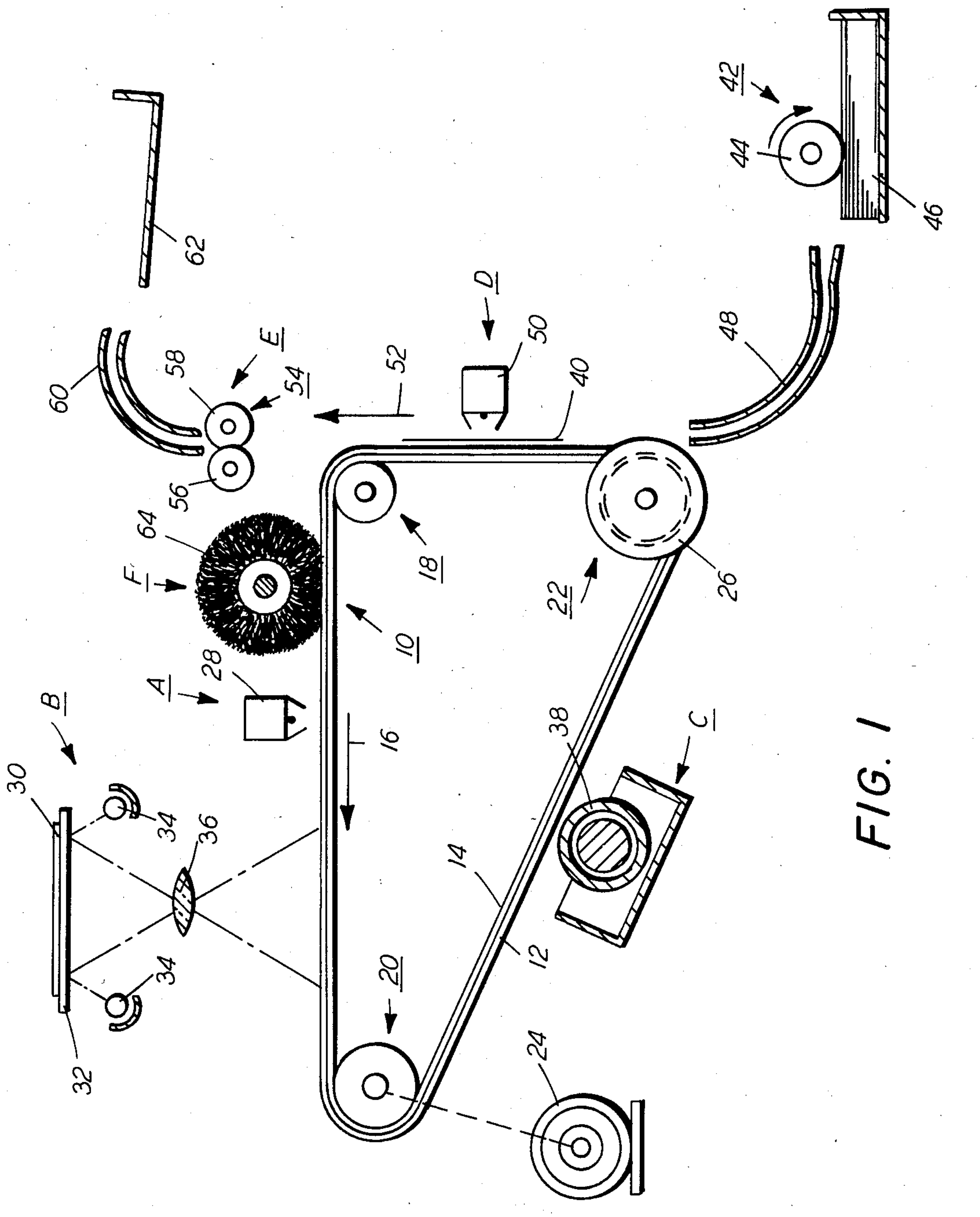
FIG. 1 is a schematic elevational view depicting an electrophotographic printing machine incorporating the features of the present invention therein.

For a general understanding of the features of the present invention, reference is made to the drawings. In the drawings, like reference numerals have been used throughout to designate identical elements. FIG. 1 schematically depicts the various components of an illustrative electrophotographic printing machine incorporating the belt support and control apparatus of the present invention therein. It will become evident from the following discussion that the belt support and control apparatus of the present invention is equally well suited for use in a wide variety of devices and is not necessarily limited in its application to the particular embodiment shown herein. For example, the apparatus of the present invention may be readily employed in magnetic tape systems, motion picture cameras and motion picture projectors, amongst others.

Inasmuch as the art of electrophotographic printing is well known, the various processing stations employed in the FIG. 1 printing machine will be shown hereinafter schematically and their operation described briefly with reference thereto.

As shown in FIG. 1, the electrophotographic printing machine employs a photoconductive belt, indicated generally by the reference numeral 10. Photoconductive belt 10 has a photoconductive surface 12 deposited on a conductive substrate 14. Preferably, photoconductive surface 12 is made from a selenium alloy with conductive substrate 14 being made from an aluminum alloy. Conductive substrate 14 is electrically grounded. Belt 10 moves in the direction of arrow 16 to advance successive portions of photoconductive surface 12 sequentially through the various processing stations disposed about the path of movement thereof. As depicted, belt 10 is entrained about stripping roller 18, drive roller 20, and control roller 22. The detailed structure of control roller 22 will be described hereinafter with reference to FIGS. 2 and 3.

Drive roller 20 is mounted rotatably and in engagement with belt 10. Motor 24 rotates roller 20 to advance belt 10 in the direction of arrow 16. Roller 20 is coupled to motor 24 by suitable means, such as a belt drive. Control roller 22 includes a pair of opposed, spaced flanges or edge guides 26. Edge guides 26 are mounted on opposed ends of roller 22 defining a space therebetween which determines the desired pre-determined path of movement for belt 10. Edge guides 26 extend in an upperwardly direction from the surface of roller 22. Preferably, edge guides 26 are circular members or flanges.

With continued reference to FIG. 1, initially a portion of belt 10 passes through charging station A. At charging station A, a corona generating device indicated generally by the reference numeral 28, charges photoconductive surface 12 of belt 10 to a relatively high, substantially uniform potential.

Next, the charged portion of photoconductive surface 12 is advanced through exposure station B. At exposure station B, an original document 30 is positioned face down on transparent platen 32. Lamps 34 flash light rays onto original document 30. The light ray reflected from original document 30 are transmitted through lens 36 forming a light image thereof. The light image is projected onto the charged portion of photoconductive surface 12 to selectively dissipate the charge thereon. This records an electrostatic latent image on photoconductive surface 12 which corresponds to the informational areas contained within original document 30.

Thereafter, belt 10 advances the electrostatic latent image recorded on photoconductive surface 12 to development station C. At development station C, a magnetic brush developer roller 38 advances a developer mix into contact with the electrostatic latent image. The latent image attracts the toner particles from the carrier granules forming a toner powder image on photoconductive surface 12 of belt 10.

Belt 10 then advances the toner powder image to transfer station D. At transfer station D, a sheet of support material 40 is moved into contact with the toner powder image. The sheet of support material is advanced through transfer station D by a sheet feeding apparatus 42. Preferably, sheet feeding apparatus 42 includes a feed roll 44 contacting the uppermost sheet of stack 46. Feed roll 44 rotates to advance the uppermost sheet from stack 46 into chute 48. Chute 48 directs the advancing sheet of support material into contact with photoconductive surface 12 of belt 10 in a timed sequence so that the toner powder image developed thereon contacts the advancing sheet of support material at transfer station D. Transfer station D includes a corona generating device 50 which sprays ions onto the backside of sheet 40. This attracts the toner powder image from photoconductive surface 12 to sheet 40. After transfer, the sheet continues to move in the direction of arrow 52 onto a conveyor (not shown) which advances the sheet to fusing station E.

Fusing station E includes a fuser assembly, indicated generally by the reference numeral 54, which permanently affixes the transferred toner powder image to sheet 40. Preferably, fuser assembly 54 includes a heated fuser roller 56 and a back-up roller 58. Sheet 40 passes between fuser roller 56 and back-up roller 58 with the toner powder image contacting fuser roller 56. In this manner, the toner powder image is permanently affixed to sheet 40. After fushing, chute 60 guides the advancing sheet 40 to catch tray 62 for removal from the printing machine by the operator.

Invariably, after the sheet of support material is separated from photoconductive surface 12 of belt 10, some residual particles remain adhering thereto. These residual particles are removed from photoconductive surface 12 at cleaning surface F. Cleaning station F includes a rotatably mounted fiberous brush 64 in contact with photoconductive surface 12. The particles are cleaned from photoconductive surface 12 by the rotation of brush 64 in contact therewith. Subsequent to cleaning, a discharge lamp (not shown) floods photoconductive surfaces 12 with light to dissipate any residual electrostatic charge remaining thereon prior to the charging thereof for the next successive imaging cycle.

It is believed that the foregoing description is sufficient for purposes of the present application to illustrate the general operation of an electrophotographic printing machine.

Figure 2:
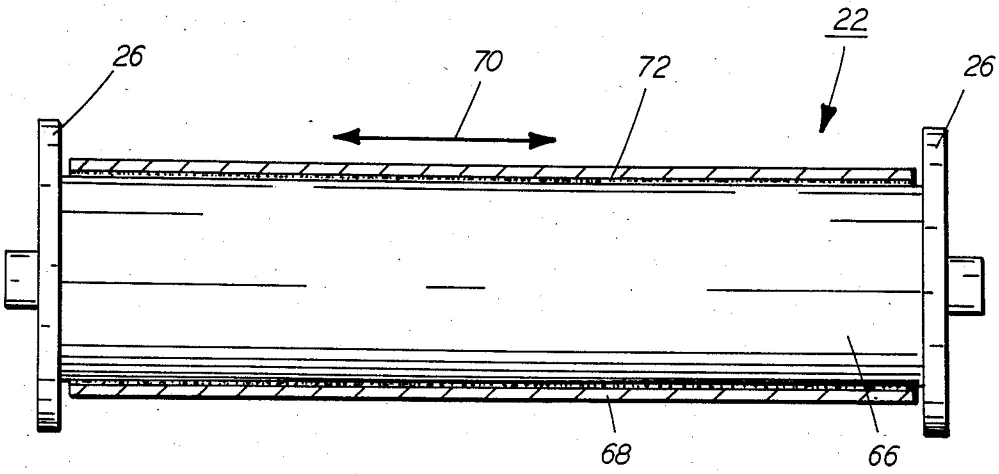
FIG. 2 is a elevational view showing the steering roller employed in the belt support system of the FIG. 1 printing machine.

Referring now to the specific subject matter of the present invention, FIG. 2 depicts control roller 22 in greater detail. Control roller 22 includes a substantially rigid inner roll 66. Inner roll 66 may be made from stainless steel. Edge guides 26 extend outwardly from the circumferential surface of inner roll 66 and are located at opposed ends thereof. An elastic membrane 68 is entrained about the entire circumferential surface of inner roller 66. The ends of elastic membrane 68 are secured to inner roll 66 by end caps (not shown) or in any other suitable manner. If the elastic membrane 68 has a low coefficient of friction, no lubricant need be interposed between elastic membrane 68 and inner roller 66. For example, if the elastic membrane is a fabric made from Nylon, a trademark of the DuPont Corporation no lubricant is required. Elastic membrane 68 is in direct contact with inner roll 66 and the coefficient of friction is fairly low. Thus, the frictional force between the surface of elastic membrane 68 adjacent to the peripheral surface of inner roll 66 has a low friction force. The maximum frictional force in the direction of lateral movement, as indicated by arrows 70, is less than the minimum force required to induce side edge buckling of belt 10. Alternatively, if elastic membrane 68 does not have a low coefficient of friction, a lubricant may be interposed between the exterior circumferential surface of inner roll 66 and the surface of elastic membrane 68 opposed therefrom. The foregoing in FIG. 2. As illustrated thereat, lubricant 72 is interposed between the peripheral surface of inner roll 66 and the surface of elastic membrane 68 opposed therefrom. In this latter embodiment, elastic membrane 68 may be made from a thin rubber material with lubricant 72 being a silicone oil or a dry lubricant, such as graphite. A dry lubricant is preferred as it will not readily migrate through a thin elastic membrane contaminating the interior surface of the photoconductive belt. The exterior circumferential surface of elastic membrane 68 is compliant and weak in lateral sheer. In this way, the portion of elastic membrane 68 contacting belt 10 is deformed as belt 10 moves in a lateral direction. The portion of elastic membrane 68 not in contact with belt 10 returns to the undeformed condition. Flanges 26 extend outwardly from inner roll 66 beyond the surface of elastic membrane 68.

Figure 3:
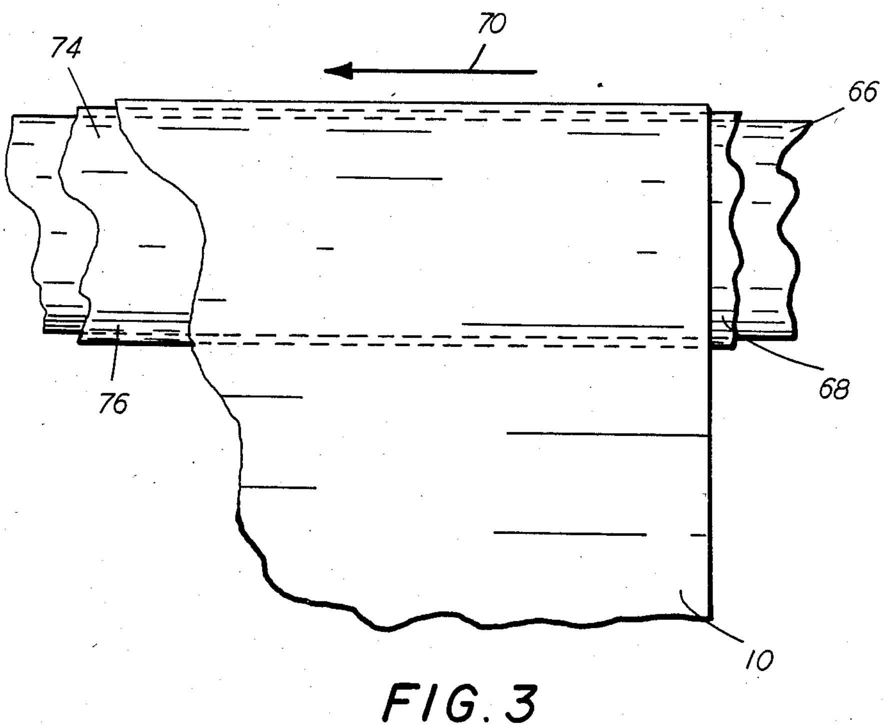
FIG. 3 is an enlarged fragmentary, schematic elevational view showing the belt moving laterally with respect to the FIG. 1 roller.

Turning now to FIG. 3, there is shown belt 10 deforming elastic membrane 68. As illustrated thereat, belt 10 moves in the lateral direction, as indicated by arrow 70. The portion of elastic membrane 68 in contact with belt 10 also moves in the lateral direction as indicated by arrow 70. However, the portion of elastic membrane 68 spaced from belt 10 remains undeformed. Thus, region 74 of elastic membrane 68 deforms in the direction of arrow 70 while region 76 remains undeformed. It is clear that region 74 of elastic membrane 68 contacts belt 10 while region 76 of elastic membrane 68 is spaced therefrom. As belt 10 moves in the direction of arrow 70, the side edge thereof contacts edge guide 26. The maximum frictional force between elastic membrane 68 and inner roll 66 is less than the minimum force required to induce buckling of the side edge of belt 10. Thus, elastic membrane 68 starts to slip with respect to inner roll 66 when the maximum frictional force between elastic membrance 68 and inner roll 66 is exceeded. The maximum force that is produced by the edge guides 26 on the side edge of belt 10 is substantially equal to the maximum frictional force between elastic membrance 68 and inner roll 66. Inasmuch as the maximum frictional force is less than the force required to induce side edge buckling of belt 10, the side edge of belt 10 does not buckle and belt 10 remains in the pre-determined path of movement.

In recapitulation, the belt support and control apparatus of the present invention includes a substantially rigid inner roll having an elastic membrane entrained about the entire circumferential surface thereof. The coefficient of friction between the elastic membrance and inner roll is low. This may be achieved by utilizing an elastic membrane made from a material having a low coefficient of friction or by interposing a lubricant between the elastic membrane and the inner roll. The maximum frictional force between the elastic membrane and the inner roll is less than the minimum force required to induce side edge buckling in the photoconductive belt. As the photoconductive belt moves in a lateral direction, the side edge thereof engages edge guides which prevent movement thereof. When the force applied by the edge guides on the side edge of the belt exceeds the maximum frictional force between the elastic membrane and the inner roll, the elastic membrane starts to slip and the force applied on the side edge no longer increases. The maximum force applied to the side edge of the belt is always maintained at a magnitude less than the force required to induce buckling therein. Hence, the belt is maintained in the pre-determined path of movement with the forces applied to the side edge thereof being less than those required for inducing side edge buckling.

It is, therefore, evident that there has been provided, in accordance with the present invention an apparatus for supporting a belt and controlling lateral movement thereof that fully satisfies the aims and advantages hereinbefore set forth. While this invention has been discribed in conjunction with a specific embodiment thereof, it is evident that many alternatives, modifications, and variations will be apparent to those skilled in the art. Accordingly, it is intended to embrance all such alternatives, modifications, and variations as fall within the spirit and broad scope of the appended claims.

We claim:

1. An apparatus for supporting a belt arranged to move in a pre-determined path and for controlling lateral movement of the belt from the pre-determined path, including:

at least one rotatably mounted roller;

means, interposed between said roller and the belt, for supporting the belt, said supporting means having a low coefficient of friction to form a low friction interface between said supporting means and said roller; and means, engaging at least one side edge of the belt, for preventing lateral movement of the belt with said supporting means slipping on said roller when the force applied on the side edge of the belt is greater than the maximum frictional force between said roller and said supporting means, in the direction of lateral movement of the belt.

2. An apparatus according to claim 1, wherein the maximum frictional force between said supporting means and said roller, in the direction of lateral movement of the belt, is less than the minimum force required to produce buckling of the side edge of the belt.

3. An apparatus according to claim 2, wherein said supporting means includes an elastic membrane entrained about said roller and having at least a compliant exterior surface weak in lateral shear so that the portion of said elastic member contacting the belt is deformed in a lateral direction as the belt moves in the lateral direction and returns to the undeformed condition when the belt is spaced therefrom.

4. An apparatus according to claim 3, wherein said supporting means includes means, interposed between said elastic membrane and said roller, for lubricating opposed surfaces of said elastic membrane and said roller so as to maintain a low coefficient of friction therebetween with the maximum frictional force therebetween being less than the minimum force required to induce buckling of the side edge of the belt.

5. An apparatus according to claim 4, wherein said preventing means includes a pair of opposed, spaced flanges with one of said pair of flanges being mounted on one end portion of said roller and the other of said pair of flanges being mounted on the other end portion of said roller, said pair of flanges extending outwardly from said roller beyond said elastic membrane.

6. An electrophotographic printing machine of the type having a photoconductive belt supported on an apparatus which moves the photoconductive belt in a pre-determined path and controls lateral movement of the photoconductive belt so that successive portions of the photoconductive belt move through processing stations disposed thereabout to form a toner powder image thereon which is transferred to a copy sheet and permanently affixed thereto, wherein the apparatus for moving the photoconductive belt and controlling lateral movement thereof includes:

at least one rotatably mounted roller;

means, interposed between said roller and the photoconductive belt, for supporting the photoconductive belt, said supporting means having a low coefficient of friction to form a low friction interface between said supporting means and said roller; and means, engaging at least one side edge of the photoconductive belt, for preventing lateral movement of the photoconductive belt with said supporting means slipping on said roller when the force applied on the side edge of the photoconductive belt is greater than the maximum frictional force between said roller and said supporting means, in the direction of lateral movement of the photoconductive belt.

7. A printing machine according to claim 6, wherein the maximum frictional force between said supporting means and said roller, in the direction of lateral movement of the photoconductive belt, is less than the minimum force required to produce buckling of the side edge of the photoconductive belt.

8. A printing machine according to claim 7, wherein said supporting means includes an elastic membrane entrained about said roller and having at least a compliant exterior surface weak in lateral shear so that the portion of said elastic member contacting the photoconductive belt is deformed in a lateral direction as the photoconductive belt moves in the lateral direction and returns to the undeformed condition when the photoconductive belt is spaced therefrom.

9. A printing machine according to claim 8, wherein said supporting means includes means, interposed between said elastic membrane and said roller, for lubricating opposed surfaces of said elastic membrane and said roller so as to maintain a low coefficient of friction therebetween with the maximum frictional force therebetween being less than the minimum force required to induce buckling of the side edge of the photoconductive belt.

10. A printing machine according to claim 9, wherein said preventing means includes a pair of opposed, spaced flanges with one of said pair of flanges being mounted on one end portion of said roller and the other of said pair of flanges being mounted on the other end portion of said roller, said pair of flanges extending outwardly from said roller beyond said elastic member.

* * * * *